United States Patent
Mao et al.

(10) Patent No.: US 6,969,933 B2
(45) Date of Patent: Nov. 29, 2005

(54) ELECTRIC MOTOR DRIVE SYSTEM AND METHOD

(75) Inventors: Weixing Mao, Rochester, MI (US); Jon C. Everhart, Jr., Rochester Hills, MI (US); Thierry R. Caussat, West Bloomfield, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 10/054,659

(22) Filed: Jan. 22, 2002

(65) Prior Publication Data

US 2003/0137202 A1 Jul. 24, 2003

(51) Int. Cl.⁷ ............................................. H20K 7/00
(52) U.S. Cl. ..................... 310/75 R; 310/71; 310/180; 310/42; 310/89; 310/67 R; 310/51
(58) Field of Search ................. 310/75 R, 71, 310/180, 42, 89, 67 R, 51

(56) References Cited

U.S. PATENT DOCUMENTS

| | | | |
|---|---|---|---|
| 4,398,135 A | 8/1983 | Busch et al. | |
| 4,572,979 A | 2/1986 | Haar et al. | |
| 4,614,886 A | 9/1986 | Schneider et al. | |
| 4,978,876 A | 12/1990 | Koster | |
| 5,041,751 A | 8/1991 | Yokozuka | |
| 5,184,039 A | 2/1993 | Kraft | |
| 5,309,053 A | 5/1994 | Ade | |
| 5,360,322 A | 11/1994 | Henein et al. | |
| 5,382,857 A | 1/1995 | Schelhorn et al. | |
| 5,444,315 A | 8/1995 | Adam et al. | |
| 5,528,093 A | 6/1996 | Adam et al. | |
| 5,625,242 A * | 4/1997 | Shiga ........................ 310/198 |
| 6,201,326 B1 * | 3/2001 | Klappenbach et al. | |
| 6,707,188 B2 * | 3/2004 | Torii | |
| 6,727,613 B2 * | 4/2004 | Kawakami et al. ....... 310/75 R |

FOREIGN PATENT DOCUMENTS

| | | |
|---|---|---|
| DE | 4233156 | 4/1994 |
| EP | 0474904 | 3/1992 |
| GB | 2209438 | 10/1989 |

* cited by examiner

Primary Examiner—Darren Schuberg
Assistant Examiner—Iraj A. Mohandesi
(74) Attorney, Agent, or Firm—Jacox Meckstroth & Jenkins

(57) ABSTRACT

An electric motor system and method are shown having a circuit board arranged in a plane that lies in a predetermined angle relative to an axis to an armature of the electric motor. In one embodiment the predetermined angle is an acute angle and the plane is not perpendicular to an axis of an armature of the motor 10. Brushes are located remotely from the board.

17 Claims, 6 Drawing Sheets

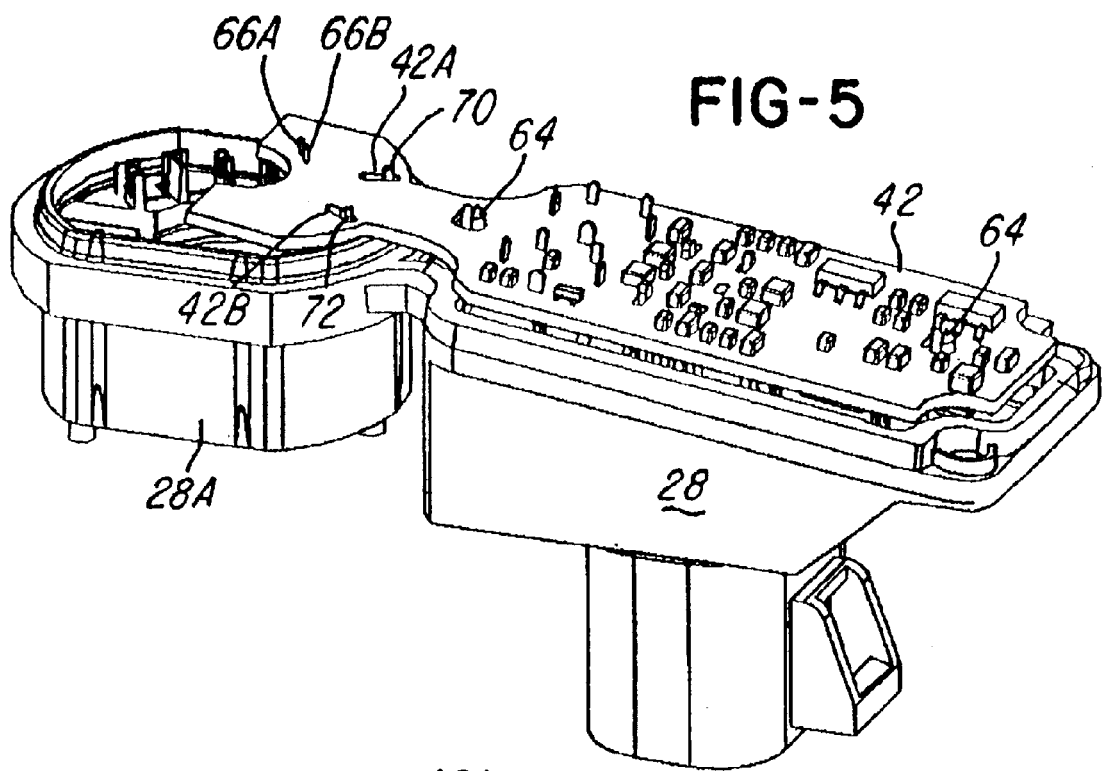
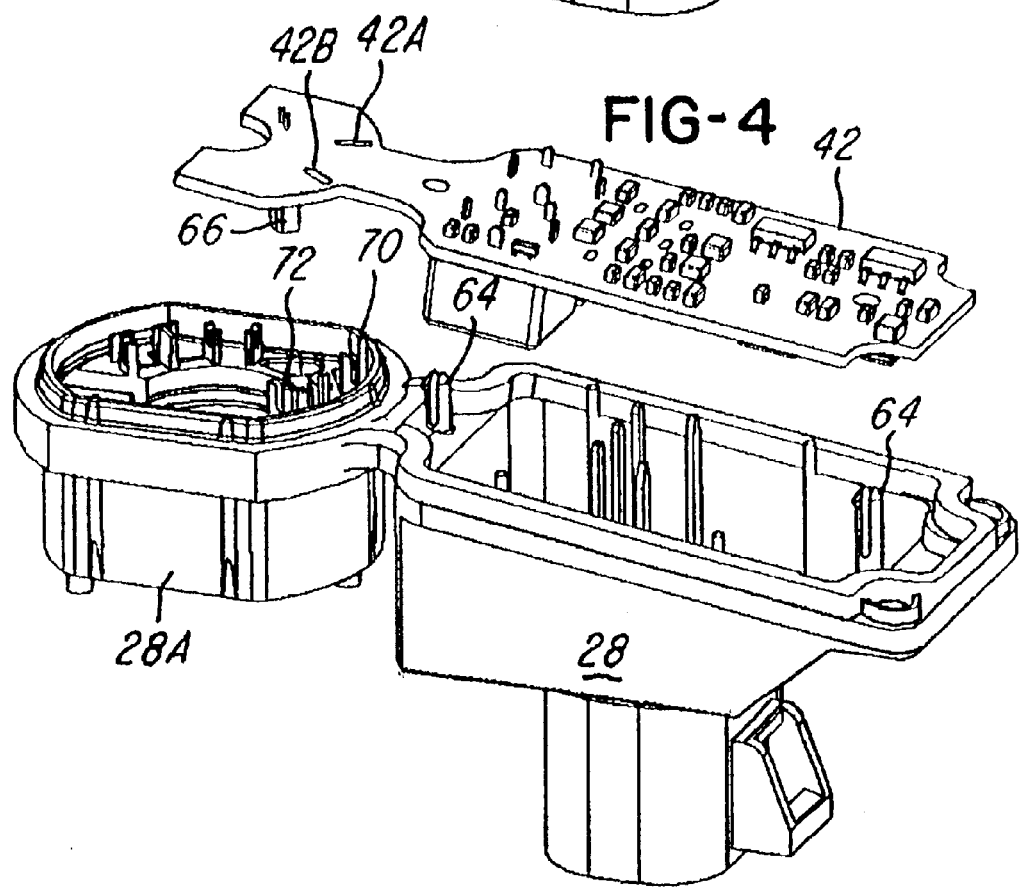

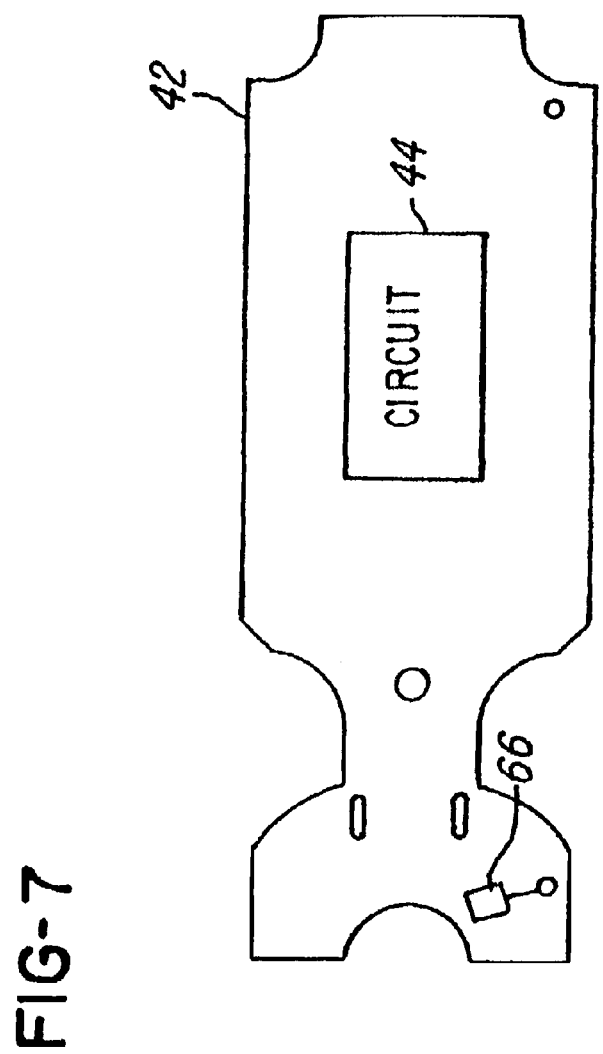

ELECTRIC MOTOR DRIVE SYSTEM AND METHOD

BACKGROUND OF THE INVENTION

1. Field of the Invention

This invention relates to a commutator motor drive gear system and method and more particularly to a motor having a circuit board that it lies in a plane that is not perpendicular to an axis of the drive motor.

2. Description of Prior Art

In the past, printed circuit boards comprised circuits for controlling electrical motors, such as window lift motors, seat drive motors and other electrical motors that are used in vehicles. It has been convenient to situate the circuit board near the motor. U.S. Pat. No. 5,528,093 discloses integrating electronics with a drive unit. A printed-circuit board, which accommodates the electronic components and which is designed, at the same time, as a brush-holder plate for the commutator motor, is arranged, together with an electronic housing, parallel to housing flanges of a motor housing of a gear housing. The printed circuit board of the drive unit is covered on its one axial side by the motor housing and the electronic housing and on its other axial side by the gear housing, thereby protecting it from external elements.

With the arrangement disclosed in the prior art U.S. Pat. No. 5,528,093, the circuit board in situated in a plane that is perpendicular to an axis of the drive motor so that the brushes, which are mounted directly on the circuit board, are situated in operative relationship with the commutator of the electric motor. One problem with this arrangement was that the circuit board had to be aligned perpendicular to the axis of the armature of the electric motor so that the brushes could be properly aligned with the commutator.

Another problem with the prior art designs is that when the brushes were situated on the board which required that the board be situated on a plane, which was substantially perpendicular to the axis of the armature. A longer armature and/or redesign of the commutator or brush holders would be needed if the board was not situated in a plane, perpendicular to the axis of the armature of the electric motor.

What is needed therefore is a simplified design that is capable of accommodating different motor and brush arrangements and that will permit a circuit board to be situated in a plane that is not perpendicular to an axis of an armature of an electric motor.

SUMMARY OF THE INVENTION

It is a primary object of the invention to provide an electric motor having a shaft and printed circuit board comprising a circuit for controlling the motor, where the printed circuit board is generally planer and lies in a plane that bisects an axis of the armature at a predetermined angle that is not perpendicular to the axis of the armature and where the brushes are not mounted directly on the board.

In one aspect, this invention comprises an electrical motor having a shaft, the electrical motor comprising a motor housing having a pair of permanent magnets situated in opposed relation therein a rotor situated on the shaft between the pair of permanent magnets the rotor comprising a plurality of windings situated thereon a commutator for passing current to the plurality of windings, a printed circuit board comprising a circuit for controlling the motor the printed circuit board being generally planar and lying in a first plane that bisects the axis to define at least one predetermined angle that is acute, a pair of brushes situated in a brush housing in operative relationship with the commutator, a pair of conductors coupling the pair of brushes to the printed circuit board and a plurality of terminals situated on the printed circuit board for coupling the circuit to a power source.

In another aspect, this invention comprises a drive unit comprising, an electrical motor having a shaft having a first gear, the electrical motor comprising, a motor housing having a pair of permanent magnets situated in opposed relation therein, a rotor situated on the shaft between the pair of permanent magnets the rotor comprising a plurality of windings situated thereon, a commutator for passing current to the plurality of windings, a printed circuit board comprising a circuit for controlling the electrical motor; the printed circuit board being generally planar, a pair of brushes situated in a brush housing in operative relationship with the commutator, a pair of conductors coupling the pair of brushes to the printed circuit board, a plurality of terminals situated on the printed circuit board for coupling the printed circuit board to a power source, a gear housing comprising a second gear rotatably mounted therein and situated in operative relationship to the first gear; and the printed circuit lying in a first plane and being mounted between the motor housing and the gear housing such that the first plane bisects the axis at a predetermined angle.

And still another aspect, this invention comprises a method for assembling an electrical motor having a shaft comprising an axis, a rotor having a plurality of windings, and a commutator for passing current to the windings, the method comprising the steps of providing a motor housing having a pair of permanent magnets situated in opposed relation therein situating the rotor between the pair of permanent magnets, situating a printed circuit board in a first plane that bisects the axis to define a predetermined angle, the printed circuit board comprising a circuit and a plurality of terminals for coupling the circuit to a power source, providing a pair of brushes in a brush housing in operative relationship with the commutator, but remote from the printed circuit board and coupling the pair of brushes to the printed circuit board.

Other objects and advantages of the invention will be apparent from the following description, with its appended claims, and the attached drawings.

BRIEF DESCRIPTION OF ACCOMPANYING DRAWING

FIG. 4 is a partially exploded view, illustrating the circuit board before it is mounted on a brush housing;

FIG. 5 illustrates the circuit board shown in FIG. 4 mounted on the brush housing;

FIG. 7 is a plan view of the circuit board used in one embodiment of the invention.

DETAILED DESCRIPTION OF PREFERRED EMBODIMENT

Figure 1:
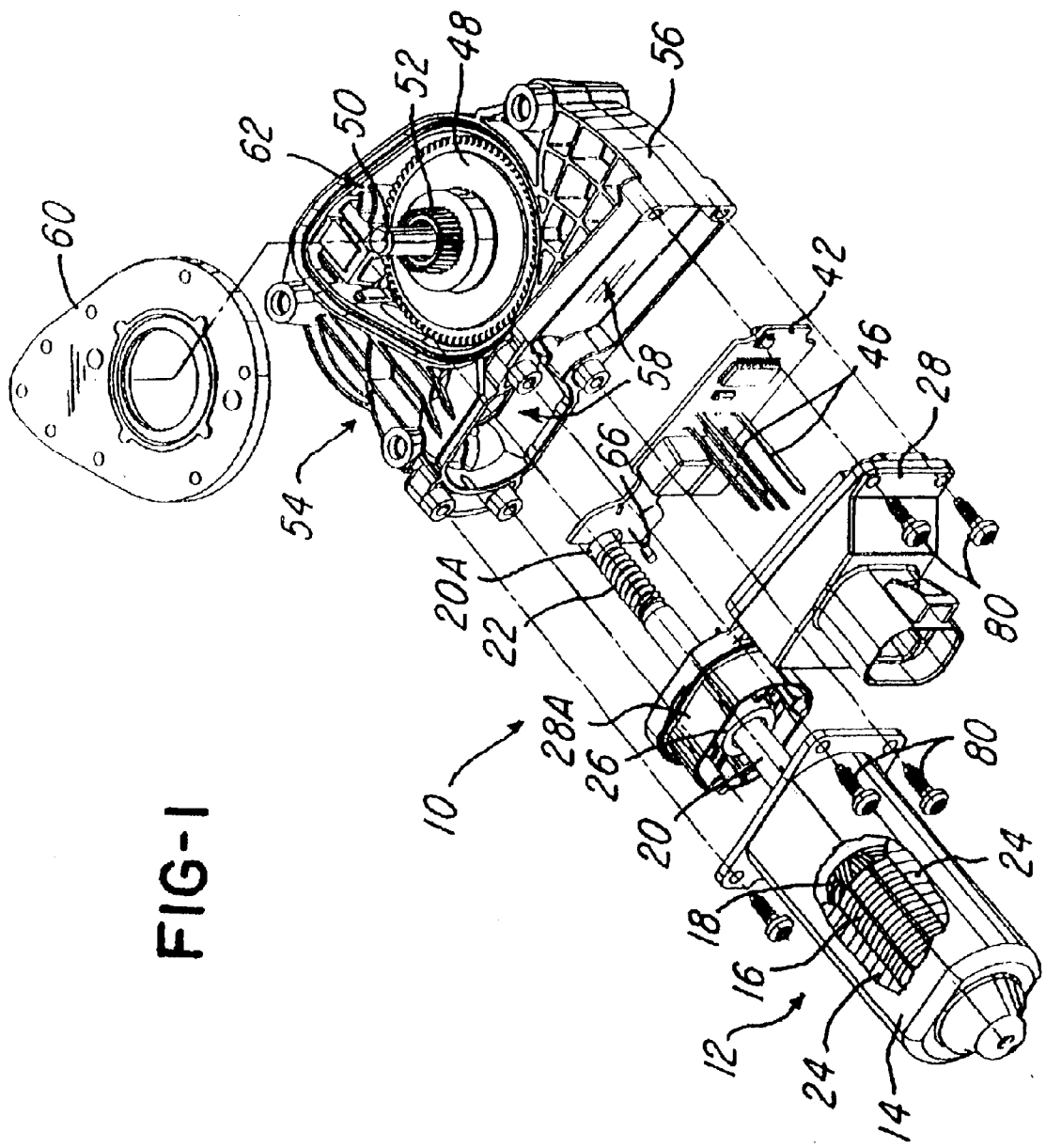
FIG. 1 is an exploded view of a drive system in accordance with one embodiment of the invention.

Referring now to FIG. 1, a drive system or unit 10 is shown. The drive system 10 comprises a drive motor 12 situated in a motor housing 14 which receives a rotor 16 comprising a plurality of windings 18. The rotor 16 is mounted on an armature 20 having a drive gear 22 towards an end 20a of the armature 20. It should be appreciated that the housing 14 comprises a pair of permanent magnets 24, which cause the armature 20 to rotate when a current is applied to the plurality of windings 18 by a commutator 26 in a manner conventionally known.

Figure 2:
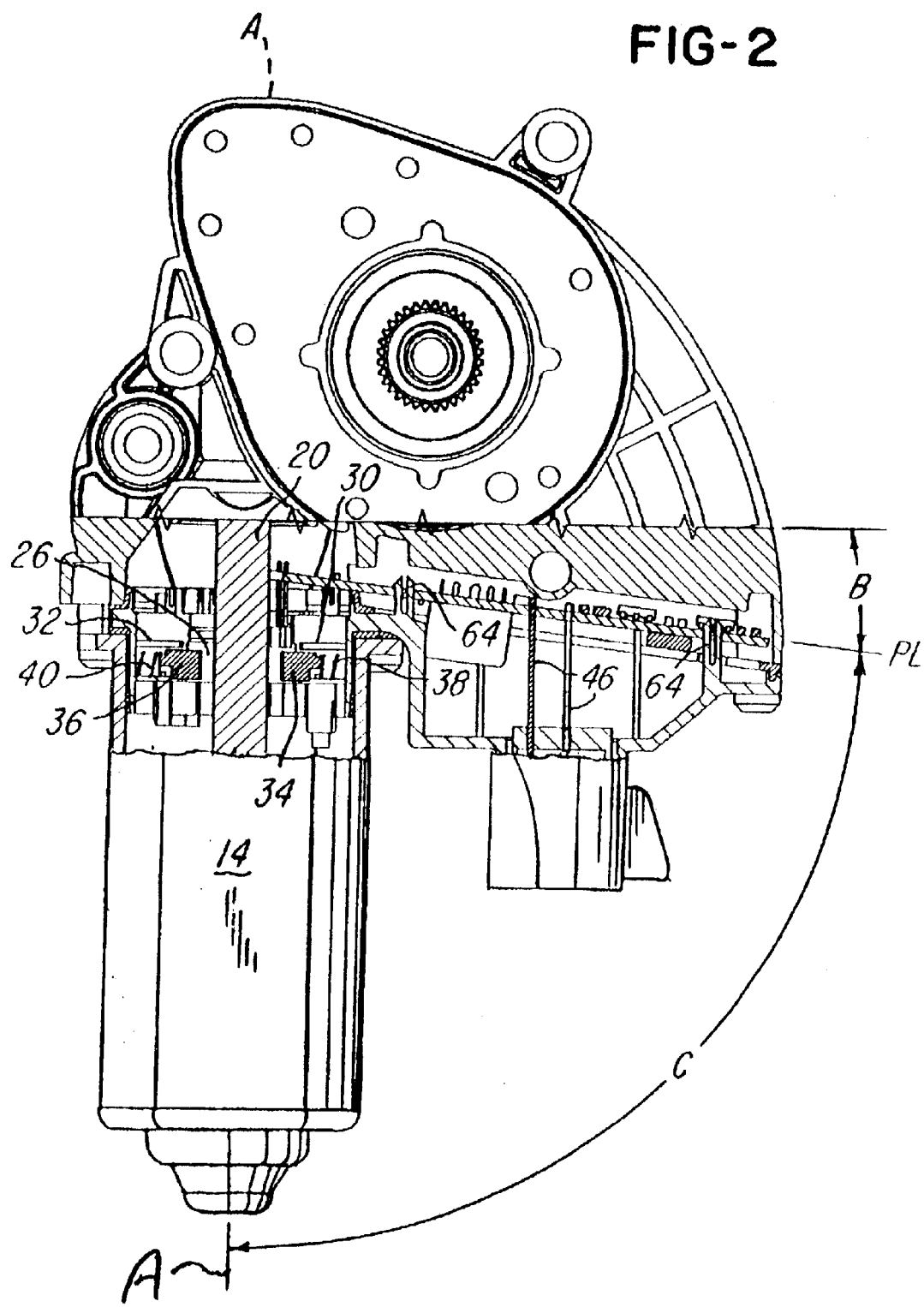
FIG. 2 is a sectional view of the system 10 after it is assembled.
Figure 3:
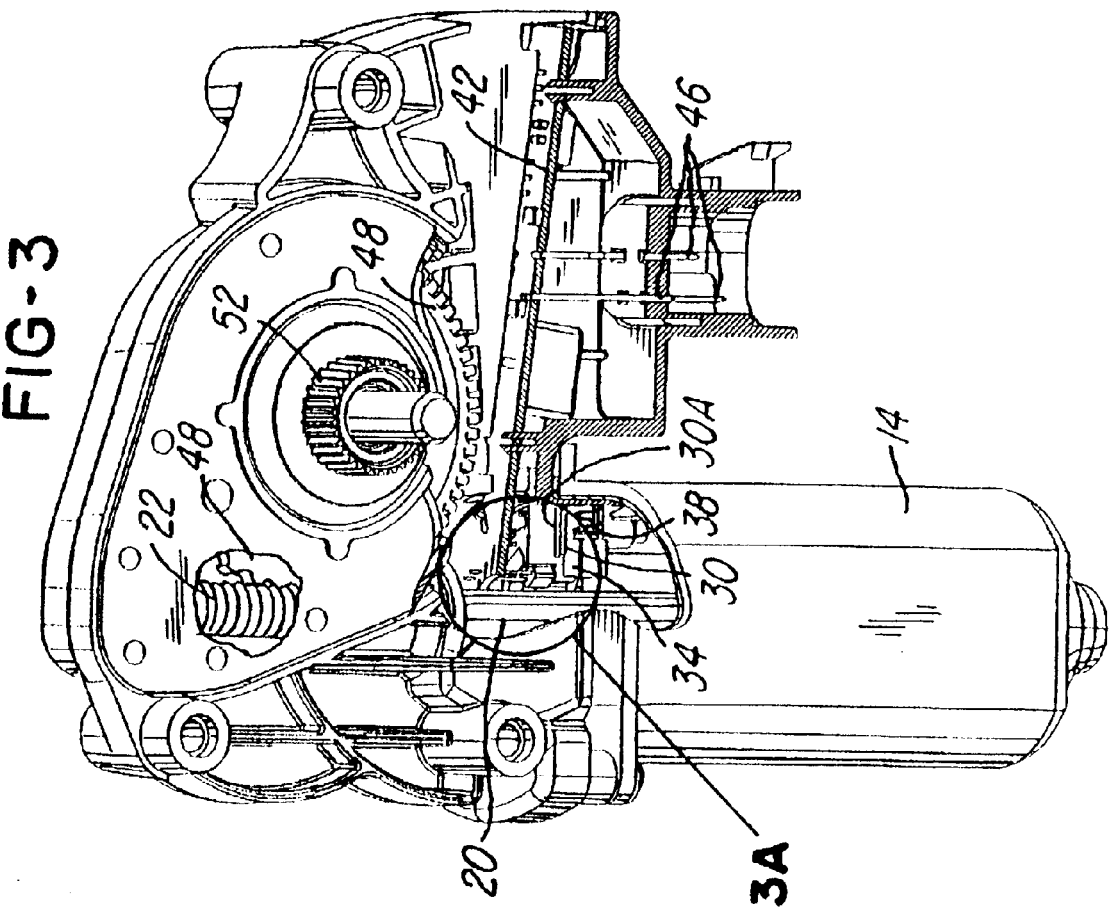
FIG. 3 is a perspective view of the assembled drive system with parts.
Figure 3A:
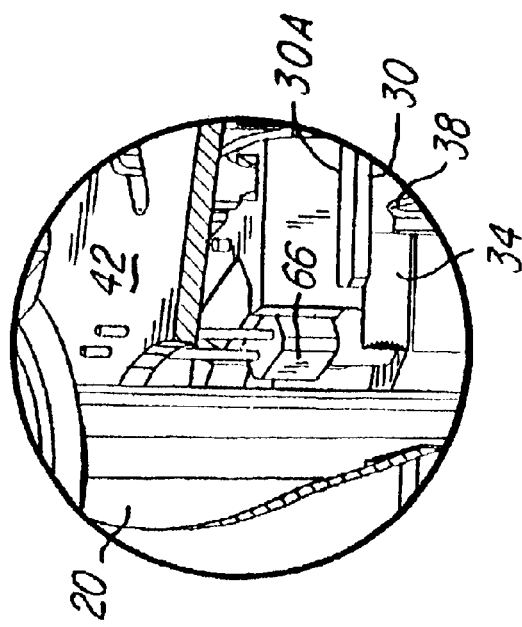
FIG. 3A is an enlarged view taken on line 3A of FIG. 3.

The system or drive unit 10 further comprises a brush housing 28 having a pair of brush holders 30 and 32 (FIG. 2) as illustrated in FIGS. 3 and 3A, brush holder 30 is defined by a wall 30a (FIGS. 3 and 3A). Note that the brush holders 30 and 32 receive the brushes 34 and 36 which are biased by springs 38 and 40, respectively, towards an axis A (FIG. 2) of armature 20.

The system or drive unit 10 further comprises the circuit board 42 (FIGS. 1 and 7), which comprises a circuit 44 for controlling operation of the system 10. The circuit 44 is coupled to a plurality of terminals 46 (FIG. 1) for coupling the circuit 44 to a power source (not shown). The circuit 44 is also coupled to the brushes 34 and 36 by suitable connectors 70 and 72 (FIG. 4), wires, shunts or the like. Thus, it should be appreciated that the brushes 34 and 36 are not mounted directly on the circuit board 42, but rather, are mounted remotely from the circuit board 42 in the brush holders 30 and 32. Note that the brushes 30 and 32 are biased towards the commutator 26 (FIG. 2) to facilitate transferring current, under control of circuit 44, to the commutator 26 and to the plurality of windings 18 on rotor 16 in order to cause the armature 20 to rotate.

As best illustrated in FIGS. 1 and 2, note that the drive gear 22 is a worm gear in the embodiment being described and cooperates with a driven gear 48 that is mounted on a shaft 50 having a second gear 52 which cooperates with another gear (not shown) in order to perform work, such as driving a window lift mechanism, seat mechanism or other mechanism, and particularly mechanisms situated in a vehicle. Note that the system 10 comprises the gear assembly 54 having a gear housing 56 with a receiving area 58, which receives the circuit board 42 as illustrated in FIGS. 2 and 3. The gear assembly 54 further comprises a gear cover 60 which is mounted on the gear housing 56 by suitable means, such as a spot weld, screws or the like. Although not shown, it should be appreciated that the gear area 62 defined by the gear housing 56 may comprise a sealing gasket (not shown) so that the gear area 62 is sealed against undesired elements, such as moisture or fluids, when the gear cover 60 is mounted on the housing 56.

Returning now to FIGS. 2–6, note that the circuit board 42 is mounted on the brush housing 28 with resilient detents 64 (FIG. 2) such that it lies in a first plane PL. Note that the first plane PL is situated at predetermined angle B relative to a radial line perpendicular to the axis A of armature 26. In the embodiment being described, the predetermined angle is an acute angle greater than 0 degrees but less than 10 degrees. It has been found that a predetermined angle of approximately 7 degrees is particularly advantageous for manufacturability. It has been found that an angle greater than 10 degrees makes the assembly of the Hall sensor 66 to the circuit board 42 and the assembly of the circuit 44 to the brush housing 28 more difficult to control and may not easily allow an "easy-to-assemble slip fit between the Hall sensor 66 and the brush housing 28.

The circuit board 42 further comprises a Hall sensor 66 (FIGS. 3 and 3A) that is mounted on the board 42 by conventional means such as dip soldering. Note that the Hall sensor 66 is situated a predetermined angle C on the board 42 such that it is positioned in operative relation with armature 26 in order to provide rotational speed information to the circuit 40. In the embodiment being described, the predetermined angle C is less than 90 degrees, but it could be greater than 90 degrees, for example, if the Hall sensor 66 was situated on the opposite side 42A (FIG. 4) of the circuit board 42.

It is important to note that after the circuit board 42 is mounted on the brush housing 14, the Hall sensor 66 is situated in operative relationship with the armature 20 so that the Hall sensor 66 can sense a rotational speed. This rotational speed is then used by circuit 44 to control the operation of the electric motor in the rotational speed of the gear 52 (FIGS. 1–3).

Figure 6:
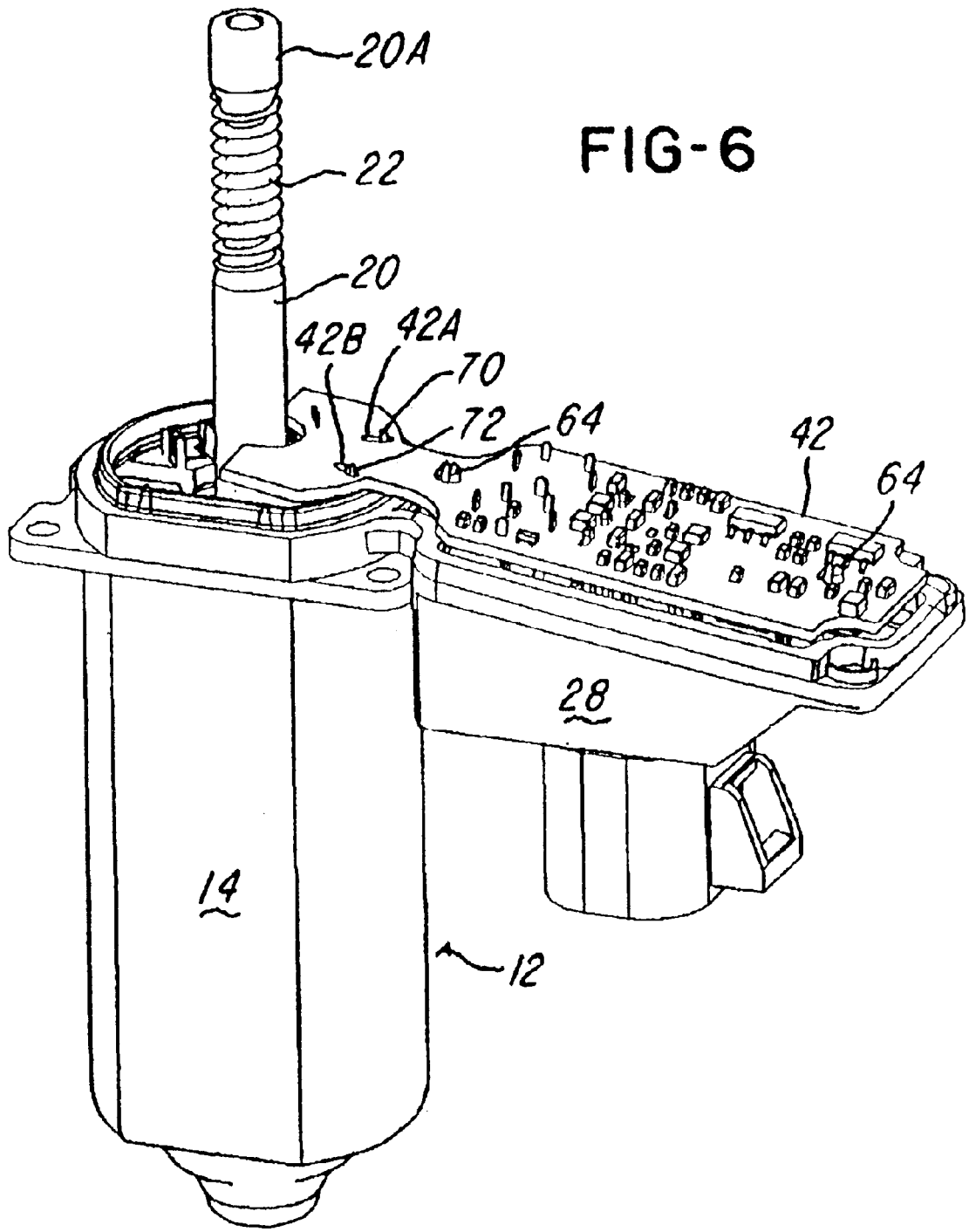
FIG. 6 is an assembled view illustrating the brush housing mounted on the electric motor assembly.

Referring to FIGS. 4–6, another embodiment of the invention is shown. In this embodiment, the circuit board 42 is mounted on the brush housing 28, which already comprises the terminals 46 situated in the brush housing 28. Note that the brushes 34 and 36 are coupled to terminals 70 and 72, respectively (FIG. 5), which are received in openings 42A and 42B, respectively of circuit board 42 as best illustrated in FIG. 5. After the circuit board 42 is mounted on the resilient detent 64 to secure the circuit board 42 to the brush housing 28, the brush terminals 70 and 72 are soldered by conventional means, such as dip soldering, to the circuit 40. The output terminals 46, if they are originally provided in the brush housing 28, are also soldered to the circuit 44 so that power can be supplied to the circuit 44.

After the circuit board 42 is mounted on the brush housing 28 and soldering is completed, the motor housing 14 is mounted on a male member 28a of housing 28 so that the armature 20 is situated in operative relationship with the Hall sensors 66 and the brushes 34 and 36 become operatively related to the commutator 26 so that current can be provided from circuit 44, through brushes 34 and 36, to the commutator 26.

As mentioned after the circuit board 42 is mounted on housing 28 and soldering is complete, the housing 14 comprises a female wall 14d that is mounted on a male portion 28a of housing 28. The housing 28 is then situated on housing 56 such that the circuit board 42 is received in the area 58, as illustrated in FIGS. 2, 3 and 3A. The assembly is then fastened together with screws 80 (FIG. 1). Although not shown, the system 10 may comprise a sealant or gasket as desired so that the circuit board and electric motor 12 are properly sealed from undesired elements such as fluids.

After the system 10 is assembled as illustrated in FIGS. 2 and 3, and mounted in a vehicle, for example, the terminals 46 may be coupled to a power source (not shown) so that when a switch, such as a window lift switch or seat switch, is actuated, circuit 40 responds by energizing motor 12 which in turn drives armature 20 to rotate gear 22 which drives gear 48 that causes gear 52 to rotate to perform the desired work.

Advantageously, this system and method provides means for situating a circuit board relative to an armature of an electric motor such that the circuit board is situated in a plane that is not perpendicular to an access of the armature 20 of the motor 12. This facilitates using conventional housing designs and also may facilitate reducing the need extending armature shafts or otherwise making design changes required by using conventional designs which mandate that the circuit board have brushes mounted directly thereon and/or lie in a plane that is perpendicular to an access of the armature 20.

While the systems and methods herein described, and the forms of apparatus for carrying these systems and methods into effect, constitute preferred embodiments of this invention, it is to be understood that the invention is not limited to these precise methods and forms of apparatus, and that changes may be made in either without departing from the scope of the invention, which is defined in the appended claims.

What is claimed is:

1. An electrical motor having a shaft having an axis, said electrical motor comprising:
    a motor housing having a pair of permanent magnets situated in opposed relation therein;
    a rotor situated on said shaft between said pair of permanent magnets; said rotor comprising a plurality of windings situated thereon;
    a commutator for passing current to said plurality of windings;
    a printed circuit board comprising a circuit for controlling said motor; said printed circuit board being generally planar and lying in a first plane that bisects said axis to define at least one predetermined angle that is acute;
    a pair of brushes situated in a brush housing in operative relationship with said commutator;
    a pair of conductors coupling said pair of brushes to said printed circuit board; and
    a plurality of terminals situated on said printed circuit board for coupling said circuit to a power source,
    the brush housing further comprises a circuit board mounting area for receiving said circuit board such that when said brush housing is mounted on said motor housing, said circuit board is oriented at said at least one predetermined angle.

2. The electrical motor as recited in claim 1 wherein said at least one predetermined angle is less than 10 degrees.

3. The electrical motor as recited in claim 2 wherein said at least one predetermined angle is approximately 7 degrees.

4. The electrical motor as recited in claim 1 wherein said brush housing is situated remotely from said printed circuit board.

5. The electrical motor as recited in claim 1 wherein said shaft comprises a magnet situated thereon, said printed circuit board comprises a Hall sensor coupled to said circuit and mounted on said circuit board such that when said circuit board is mounted in operative relationship to said electrical motor, said Hall sensor is situated in operative relationship with said magnet in order to sense a speed of said shaft.

6. The electrical motor as recited in claim 3 wherein said shaft comprises a magnet situated thereon, said printed circuit board comprises a Hall sensor coupled to said circuit and mounted on said circuit board such that when said circuit board is mounted in operative relationship to said electrical motor, said Hall sensor is situated in operative relationship with said magnet in order to sense a speed of said shaft.

7. The electrical motor as recited in claim 4 wherein said shaft comprises a magnet situated thereon, said printed circuit board comprises a Hall sensor coupled to said circuit and mounted on said circuit board such that when said circuit board is mounted in operative relationship to said electrical motor, said Hall sensor is situated in operative relationship with said magnet in order to sense a speed of said shaft.

8. The electrical motor as recited in claim 1 wherein said predetermined angle is greater than zero but less than 10 degrees.

9. The electrical motor as recited in claim 2 wherein said at least one predetermined angle is approximately 7 degrees.

10. The electrical motor as recited in claim 1 wherein said brushes are situated remotely from said printed circuit board.

11. The electrical motor as recited in claim 1 wherein said shaft comprises a magnet situated thereon, said printed circuit board comprises a Hall sensor coupled to said circuit and mounted on said circuit board such that when said circuit board is mounted in operative relationship to said drive unit, said Hall sensor is situated in operative relationship with said magnet in order to sense a speed of said shaft.

12. The electrical motor as recited in claim 1 wherein said at least one predetermined angle is greater than zero but less than 10 degrees.

13. The electrical motor as recited in claim 12 wherein said at least one predetermined angle is approximately 7 degrees.

14. The electrical motor as recited in claim 8 wherein said brushes are situated in said brush housing remotely from said printed circuit board.

15. The electrical motor as recited in claim 9 wherein said shaft comprises a magnet situated thereon, said printed circuit board comprises a Hall sensor coupled to said circuit and mounted on said circuit board such that when said circuit board is mounted in operative relationship to said electrical motor, said Hall sensor is situated in operative relationship with said magnet in order to sense a speed of said shaft.

16. The electrical motor as recited in claim 13 wherein said shaft comprises a magnet situated thereon, said printed circuit board comprises a Hall sensor coupled to said circuit and mounted on said circuit board such that when said circuit board is mounted in operative relationship to said electrical motor, said Hall sensor is situated in operative relationship with said magnet in order to sense a speed of said shaft.

17. The electrical motor as recited in claim 16 wherein said shaft comprises a magnet situated thereon, said printed circuit board comprises a Hall sensor coupled to said circuit and mounted on said circuit board such that when said circuit board is mounted in operative relationship to said electrical motor, said Hall sensor is situated in operative relationship with said magnet in order to sense a speed of said shaft.

* * * * *